(12) United States Patent
Jin et al.

(10) Patent No.: US 12,710,585 B2
(45) Date of Patent: Aug. 18, 2026

(54) OPTICAL PHASED ARRAY, METHOD FOR PREPARING OPTICAL PHASED ARRAY AND PHASE-SHIFTING CONTROL SYSTEM

(71) Applicant: UNITED MICROELECTRONICS CENTER CO., LTD., Chongqing (CN)

(72) Inventors: Li Jin, Chongqing (CN); Ping Jiang, Chongqing (CN); Youxi Lu, Chongqing (CN); Jianzhong Han, Chongqing (CN); Jin Guo, Chongqing (CN); Junbo Feng, Chongqing (CN); Zuwen Liu, Chongqing (CN); Rui Cao, Chongqing (CN); Qixin Liu, Chongqing (CN); Beibei Wu, Chongqing (CN); Mijie Yang, Chongqing (CN); Tonghui Li, Chongqing (CN)

(73) Assignee: United Microelectronics Center Co., Ltd, Chongqing (CN)

( * ) Notice: Subject to any disclaimer, the term of this patent is extended or adjusted under 35 U.S.C. 154(b) by 929 days.

(21) Appl. No.: 17/925,416

(22) PCT Filed: Oct. 16, 2020

(86) PCT No.: PCT/CN2020/121462
§ 371 (c)(1),
(2) Date: Mar. 18, 2023

(87) PCT Pub. No.: WO2021/227357
PCT Pub. Date: Nov. 18, 2021

(65) Prior Publication Data

US 2023/0400630 A1 Dec. 14, 2023

(51) Int. Cl.
*G02B 6/12* (2006.01)
*G02B 6/132* (2006.01)
(Continued)

(52) U.S. Cl.
CPC .......... *G02B 6/12011* (2013.01); *G02B 6/132* (2013.01); *G02F 1/292* (2013.01); *G02F 1/2955* (2013.01); *G02B 2006/12061* (2013.01)

(58) Field of Classification Search
CPC ................ G02B 6/12011; G02B 6/132; G02B 2006/12061; G02F 1/035; G02F 1/2955; G02F 1/292
See application file for complete search history.

(56) References Cited

U.S. PATENT DOCUMENTS 4,232,399 A * 11/1980 Heiter .................... H04B 7/084 327/237
6,408,008 B1 * 6/2002 Komarek ............. H04M 9/005 370/458
(Continued)

FOREIGN PATENT DOCUMENTS

CN 107843957 A 3/2018
CN 109581329 A 4/2019
(Continued)

*Primary Examiner* — Thomas A Hollweg
*Assistant Examiner* — Erin D Chiem
(74) *Attorney, Agent, or Firm* — IPRTOP LLC

(57) ABSTRACT

An optical phased array is provided, including: a silicon substrate; a silicon oxide layer; an optical waveguide layer including a coupling beam splitter and a grating antenna; a silicon oxide cladding layer, disposed around the optical waveguide layer and filled in the band-shaped gap; and one or more lithium niobate phase shifters; each lithium niobate phase shifter includes: a lithium niobate thin film located in the band-shaped gap, a lithium niobate optical waveguide disposed over the lithium niobate thin film and connected to the coupling beam splitter and the grating antenna, modulation electrodes. The present disclosure uses materials with high electro-optical coefficient and low loss, such as lithium niobate, to replace thermal modulation resistors and the phase modulation mode based on carrier injection used in
(Continued)

optical phased arrays, so that the optical phase modulation with low power consumption, high speed and low waveguide loss can be performed.

18 Claims, 5 Drawing Sheets

(51) Int. Cl.

| | |
|---|---|
| ***G02F 1/035*** | (2006.01) |
| ***G02F 1/29*** | (2006.01) |
| ***G02F 1/295*** | (2006.01) |

(56) References Cited

U.S. PATENT DOCUMENTS

| | | | | |
|---|---|---|---|---|
| 8,280,201 | B2 * | 10/2012 | Prosyk | G02F 1/225 359/239 |
| 9,203,348 | B2 * | 12/2015 | Ahmed | H03F 3/68 |
| 10,901,293 | B1 * | 1/2021 | Guo | G01S 7/4817 |
| 2009/0021332 | A1 * | 1/2009 | Brekelmans | H10D 84/212 334/55 |
| 2019/0219888 | A1 * | 7/2019 | Sun | G02F 1/2955 |
| 2020/0259256 | A1 * | 8/2020 | Yu | G01S 17/26 |
| 2020/0355980 | A1 * | 11/2020 | Celo | G02F 1/31 |
| 2021/0223657 | A1 * | 7/2021 | Wang | G02B 6/00 |

FOREIGN PATENT DOCUMENTS

| | | | | | |
|---|---|---|---|---|---|
| CN | 109839625 | A | | 6/2019 | |
| CN | 110609399 | A | | 12/2019 | |
| JP | 2009300888 | A | | 12/2009 | |
| KR | 20160038856 | A | * | 4/2016 | G02B 6/28 |

* cited by examiner 308
306
309
305
304
302
301

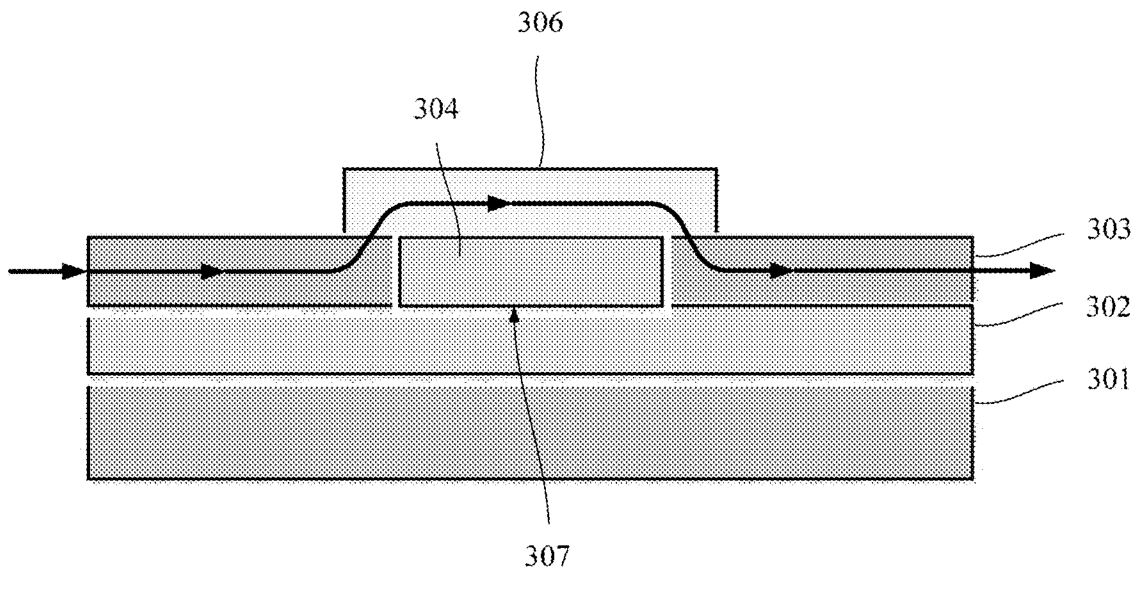

FIG. 3

S11: provide a silicon-on-insulator (SOI) substrate, the SOI substrate comprises a silicon substrate, a silicon oxide layer, and a silicon base layer

↓

S12: etch the silicon base layer to form an optical waveguide layer, the optical waveguide layer includes a coupling beam splitter and a grating antenna, and a band-shaped gap is set between the coupling beam splitter and the grating antenna

↓

S13: dispose a silicon oxide cladding layer around the optical waveguide layer and in the band-shaped gap

↓

S14: bond a lithium niobate layer on the optical waveguide layer and the silicon oxide cladding layer, and etch the lithium niobate layer to form a lithium niobate thin film over the band-shaped gap and a lithium niobate optical waveguide connecting the coupling beam splitter and the grating antenna

↓

S15: prepare modulation electrodes on the lithium niobate thin film on two sides of the lithium niobate optical waveguide to form a lithium niobate phase shifter

FIG. 4

OPTICAL PHASED ARRAY, METHOD FOR PREPARING OPTICAL PHASED ARRAY AND PHASE-SHIFTING CONTROL SYSTEM

Cross Reference to Related Patent Application

The present application is the US national stage of PCT/CN2020/121462 filed on 2020 Oct. 16, which claims the priorities of the CN 202010413445.8 filed on 2020 May 15 and CN 202010427704.2 filed on 2020 May 19, which applications are incorporated herein by reference.

TECHNICAL FIELD

The present disclosure relates to the field of silicon optical device design and manufacturing, and in particular, to an optical phased array based on lithium niobate thin films for phase shifting control, a method for preparing an optical phased array based on lithium niobate thin films and a phase-shifting control system.

BACKGROUND

Silicon optical technology has made many breakthroughs and achievements in optoelectronic devices, such as light sources, modulators, waveguides and detectors. Silicon-based materials have many advantages, for example, low cost, good ductility, optical devices can be prepared by using silicon CMOS processes, which can be easily integrated with other existing components.

Due to lattice properties of silicon, the linear electro-optical effect of silicon is relatively weak, making optical modulation in silicon mainly dependent on the free carrier dispersion effect. However, the intrinsic absorption and nonlinear characteristics of free carrier dispersion reduces the amplitude of optical modulation, and can lead to signal distortion when using advanced modulation formats. As a result, silicon optical modulators either show a low opto-electronic bandwidth or show a high operating voltage.

Optical phased arrays, as devices that enable spatial scanning by light beams, have a wide range of potential applications in the fields of distance sensing, laser scanning imaging, and free-space optical communication. In the prior art, most purely silicon-based optical phased array lidars use the thermo-optical effect or carrier injection based on the electro-optical effect to change the optical phase of each channel of the optical phased arrays, thus achieving beam-forming. However, as mentioned above, silicon-based thermo-optic phase modulation and phase modulation based on carrier injection have many disadvantages, such as high power consumption during phase shifting, low rate and high waveguide loss, which can greatly affect the performance of the optical phased arrays and thus the ranging system.

Silicon-based optical phased arrays and photonic artificial intelligence generally use the thermo-optical effect or carrier injection based on the electro-optical effect to change the optical phase of each channel and thus control the optical phase. With the development of technology, silicon-based optical phased arrays and photonic artificial intelligence chips put forward more and more requirements, and accordingly optical phase shifting control is also facing an increase in the scale of phase shifting control, and stricter demand for overall power consumption as well as thermal stability. There is a need for a new optical phase shifter with high phase shifting efficiency, low phase shifting loss and high phase shifting rate.

Lithium niobate thin films have the characteristics described above, e.g., low phase shifting power, low phase shifting loss and high phase shifting rate. However, due to the characteristics of lithium niobate, a circuit system with a small current and a large voltage modulation range is required to drive phase shifters for optical phase shifting control.

The traditional control method adopts dedicated digital-to-analog converter (DAC) chips with multiple channels; with the increase in the size of the array, it is increasingly difficult to control the volume, power consumption, cost of the system; more importantly, the method has the problem of low efficiency of phase modulation.

Taking traditional laser array chips, such as the 256 channel optical phased array based on thermos-optic phased modulation, as an example, the power consumption of a single channel can reach tens of milliwatts, then power consumption of the entire phase-shifting control system can reach tens of watts. In addition, the phase-shifting control system is sensitive to temperature, which introduces another problem of temperature control, and makes it difficult to achieve stability of the phase-shifting control system, lowering the efficiency of phase modulation.

There is an urgent need for a phase-shifting control circuit that can improve the efficiency of phase modulation, increase the integration of the circuit system to which the phase-shifting control circuit belongs, and reduce the size and power consumption of the circuit system.

The silicon-based thermo-optic phase modulation and the phase modulation based on carrier injection have many disadvantages, such as high power consumption of phase shifting, low rate and high waveguide loss, which can greatly affect the performance of optical phased arrays. The traditional silicon based phase control adopts dedicated DAC chips; with the increase in the size of the array, it is increasingly difficult to control the volume, power consumption, cost of the system. Taking the 256 channel optical phased array based on thermos-optic phased modulation, as an example, the power consumption of a single channel can reach tens of milliwatts, then power consumption of the entire phase-shifting control system can reach tens of watts. In addition, the phase-shifting control system is sensitive to temperature, which introduces another problem of temperature control, and makes it difficult to achieve stability of the phase-shifting control system.

SUMMARY

The present disclosure provides an optical phased array based on lithium niobate thin films for phase shifting control, a method for preparing the optical phased array based on lithium niobate thin films, and a phase-shifting control system; the present disclosure realizes a new phase shifting method based on the optical phased array, reduces power consumption of silicon-based optical phased array systems, improves the modulation rate of silicon-based optical phased arrays, and reduces the waveguide loss of silicon-based optical phased array systems; the phase-shifting control system of the present disclosure effectively reduces the control complexity of the optical phased array and reduces the size of the phase-shifting control system; the phase-shifting control circuit of the present disclosure has the following beneficial effects: when a first output terminal of a power output unit outputs a voltage to a first phase shifting unit that is currently coupled to an output terminal of an output channel, an output voltage of a second output terminal of the power output unit is modulated to a preset value required by a second phase shifting unit, which can effectively use the time for outputting the first phase shifting voltage, improve the efficiency of phase modulation and increase the integration of the circuit system to which the phase shifting control circuit belongs, thereby reducing the size and power consumption of the circuit system.

The optical phased array includes: a silicon substrate; a silicon oxide layer, disposed over the silicon substrate; an optical waveguide layer, disposed over the silicon oxide layer; the optical waveguide layer includes a coupling beam splitter and a grating antenna, a band-shaped gap is set between the coupling beam splitter and the grating antenna; a silicon oxide cladding layer, disposed around the optical waveguide layer and filled in the band-shaped gap; and one or more lithium niobate phase shifters; each lithium niobate phase shifter includes: a lithium niobate thin film located in the band-shaped gap; a lithium niobate optical waveguide disposed over the lithium niobate thin film and connected to the coupling beam splitter and the grating antenna; and modulation electrodes, the modulation electrodes are located on the lithium niobate thin film on two sides of the lithium niobate optical waveguide.

In an embodiment, the optical phased array is connected to a laser, an output terminal of the laser is connected to an input terminal of the coupling beam splitter. A light beam emitted by the laser is a light beam with a narrow linewidth.

In an embodiment, the coupling beam splitter includes a plurality stages of 50:50 beam splitting units connected in series; the coupling beam splitter includes an input terminal and a plurality of output terminals, and the output terminals of the coupling beam splitter output light waves with the same light intensity.

In an embodiment, each lithium niobate optical waveguide is connected to one of the output terminals of the coupling beam splitter and an input terminal of the grating antenna, and the lithium niobate optical waveguide is located above and overlaps the output terminal of the coupling beam splitter and the input terminal of the grating antenna.

In an embodiment, a material of the optical waveguide layer includes one of silicon and silicon nitride.

In an embodiment, the lithium niobate optical waveguide is a ridged waveguide.

In an embodiment, each of the modulation electrodes includes a ground electrode and a control electrode, the ground electrode is grounded, and the control electrode is used to input a control signal, which is applied to two sides of a corresponding one of the lithium niobate optical waveguides through the control electrode, to change refractive index of a light wave transmission region of the corresponding lithium niobate optical waveguide, thereby changing a phase of light waves during transmission.

The present disclosure also provides the method for preparing an optical phased array based on lithium niobate thin films for phase shifting control, the method includes: 1) providing a silicon-on-insulator (SOI) substrate, the SOI substrate includes a silicon substrate, a silicon oxide layer, and a silicon base layer; 2) etching the silicon base layer to form an optical waveguide layer, the optical waveguide layer includes a coupling beam splitter and a grating antenna, and a band-shaped gap is set between the coupling beam splitter and the grating antenna; 3) disposing a silicon oxide cladding layer around the optical waveguide layer and in the band-shaped gap; 4) bonding a lithium niobate layer on the optical waveguide layer and the silicon oxide cladding layer, and etching the lithium niobate layer to form a lithium niobate thin film over the band-shaped gap and a lithium niobate optical waveguide connecting the coupling beam splitter and the grating antenna; and 5) preparing modulation electrodes on the lithium niobate thin film on two sides of the lithium niobate optical waveguide to form a lithium niobate phase shifter.

The present disclosure also provides a method of applying an optical phased array based on lithium niobate thin films for phase shifting control. The method includes: 1) outputting, by a laser, a light beam with a narrow linewidth to an input terminal of a coupling beam splitter, and splitting, by the coupling beam splitter, the light beam into multiple channels of light waves; 2) for each channel of the light waves, performing phase-modulation on the light waves after them enter a corresponding one of the one or more lithium niobate phase shifters so that there is a predetermined phase-shift among the light waves; and 3) for each channel of the light waves, outputting light waves with a certain phase to the grating antenna, and emitting, the light waves with the certain phase, by the grating antenna, into space at a predetermined angle.

In an embodiment, in step 2), after the light waves enter the corresponding lithium niobate phase shifter, based on an electro-optic effect of lithium niobate, exerting a control signal on the modulation electrodes to change refractive index of lithium niobate in the corresponding lithium niobate phase shifter, so that the phase of light waves in the corresponding lithium niobate phase shifter is shifted through phase-modulation.

The present disclosure also provides an optical phased array system based on lithium niobate thin films. The optical phased array system includes the optical phased array based on lithium niobate thin films for phase shifting control as described above and a control circuit; the control circuit includes: a power output unit, used to output a voltage; a metal-oxide-semiconductor (MOS) transistor switching array, connected between the power output unit and a control electrode of the optical phased array, providing a phase shifting channel for the optical phased array; a capacitor array, two terminals of each capacitor unit of the capacitor array are connected to the control electrode and a ground electrode of the optical phased array respectively; and a control unit, used to provide logic and timing control for the optical phased array system through a control bus.

In an embodiment, the MOS transistor switching array includes a plurality of MOS transistor switching units, each MOS transistor switching unit includes a diode, a PMOS transistor, an NMOS transistor and a resistor; the diode is set in each phase shifting channel and is used to isolate currents in the phase shifting channels from each other; a first terminal of the PMOS transistor is connected to the diode, a second terminal of the PMOS transistor is connected to a terminal of a capacitor unit of the capacitor array, a gate of the PMOS transistor is connected to a first terminal of the NMOS transistor, a second terminal of the NMOS transistor is grounded, a gate of the NMOS transistor is connected to the control bus, and the resistor is connected between the first terminal of the PMOS transistor and the gate of the PMOS transistor.

In an embodiment, the control circuit is fabricated into a control chip by adopting a CMOS process and bonded with the optical phased array chip based on lithium niobate thin films for phase shifting control by adopting a three-dimensional integration process, to obtain the optical phased array based on lithium niobate thin films and the phase-shifting control circuit.

The present disclosure also provides a phase-shifting control circuit. The phase-shifting control circuit includes: a power output unit, including a plurality of output terminals, each output terminal is used to output an output voltage; an output channel, an input terminal of the output channel is coupled to one of the plurality of output terminals; and a phase shifting unit array, including a plurality of phase shifting units; an output terminal of the output channel is coupled to one of the plurality of phase shifting units.

In an embodiment, the phase-shifting control circuit further includes: a power output switching switch, provided with a plurality of phase-shifting input terminals and one phase-shifting output terminal; the plurality of output terminals of the power output unit are coupled to the input terminal of the output channel through the power output switching switch.

In an embodiment, the plurality of phase shifting units includes a first phase shifting unit and a second phase shifting unit, and the plurality of output terminals of the power output unit includes a first output terminal and a second output terminal; duration operation, the output terminal of the output channel is sequentially coupled to each phase shifting unit in a predetermined order, and when the first output terminal of the power output unit outputs a first phase shifting voltage to the first phase shifting unit that is currently coupled to the output terminal of the output channel, an output voltage of the second output terminal of the power output unit is modulated to be a second phase shifting voltage required by the second phase shifting unit; after a preset time period, the second output terminal of the power output unit is coupled to the input terminal of the output channel to output the second phase shifting voltage required by the second phase shifting unit to the second phase shifting unit.

In an embodiment, the phase-shifting control circuit further includes: a power output switching switch, used to control a selected output terminal of the output terminals of the power output unit to couple to the input terminal of the output channel, to output a phase shifting voltage to a selected phase shifting unit of the phase shifting units.

In an embodiment, the phase-shifting control circuit further includes: a phase-shifting switching switch, the phase-shifting switching switch has a phase-shifting input terminal and a plurality of phase-shifting output terminals; the output terminal of the output channel is sequentially coupled to each phase shifting unit through the phase-shifting switching switch; at a given time the output terminal of the output channel is coupled to at most one phase shifting unit.

In an embodiment, the phase-shifting control circuit further includes: a phase-shifting switching switch, used to control the output terminal of the output channel to couple to a corresponding phase shifting unit according to the predetermined order.

In an embodiment, each phase shifting unit includes: a capacitor and an optical waveguide device; the optical waveguide device and the capacitor are connected in parallel.

In an embodiment, the optical waveguide device is a lithium niobate optical waveguide device.

In an embodiment, the phase-shifting control circuit further includes: a control unit, used to provide logic and timing control for the phase-shifting control circuit through a control bus.

In an embodiment, the phase-shifting control circuit is applied to phase-shifting control systems for silicon-based optical phased arrays, photonic artificial intelligence, micro-electro-mechanical system (MEMS) switches, and piezoelectric materials.

The present disclosure also provides a phase-shifting control system. The phase-shifting control system includes a phase-shifting control circuit as described above, an array of phase shifting units in the phase-shifting control circuit includes an optical phased array based on lithium niobate thin films for phase shifting control as described above.

As described above, the optical phased array based on lithium niobate thin films for phase shifting control, the method for preparing the optical phased array based on lithium niobate thin films and the phase-shifting control system of the present disclosure have the following beneficial effects:

The present disclosure provides a novel optical phase shifter based on lithium niobate thin films and applies the optical phase shifter to silicon-based optical phased arrays. In the present disclosure, materials with high electro-optical coefficient and low loss, such as lithium niobate, replace thermal modulation resistors and the phase modulation mode based on carrier injection used in conventional optical phased arrays, so that optical phase modulation with low power consumption, high speed and low waveguide loss can be performed by optical phased arrays.

In the present disclosure, the lithium niobate thin film is attached to the optical phased array by adopting a bonding process, then the lithium niobate thin film is etched to form the optical waveguide, and finally the modulation electrodes for shifting an optical phase of light waves are formed on the surface of the lithium niobate thin film by adopting a sputtering process. The modulation electrodes is used to modulate the loading of the control signal through the low half-wave voltage that the lithium niobate thin film phase shifter has. Besides, the present disclosure can be combined with conditional CMOS processes to achieve low optical transmission loss and high modulation speed, which can greatly enhance the power of the light waves emitted by the silicon-based optical phased arrays and the scanning speed of silicon-based optical phased arrays and improve the performance of the optical phased arrays.

In the present disclosure, due to the fact that lithium niobate thin film phase shifters have high impedance and low power consumption, the MOS transistor switching array is used to control the electric field control voltage by scanning, which can greatly reduce the complexity of the system and improve the integratability.

In the present disclosure, the control circuit is fabricated into a control chip by adopting a CMOS process and bonded with the optical phased array chip based on lithium niobate thin films by adopting a three-dimensional integration process, to greatly reduce the size of the system.

In the phase-shifting control circuit of the present disclosure, the power output unit includes a plurality of output terminals; each output terminal is used to output an output voltage; the input terminal of the output channel is coupled to one of the plurality of output terminals of the power output unit; the output terminal of the output channel is coupled to one of the plurality of phase shifting units. In the prior art, the power output unit only has one output terminal; when the output terminal of the power output unit outputs a phase shifting voltage to the output channel, the output channel needs to be connected to a selected phase shifting unit first, and then it takes time to adjust the output voltage to the phase shifting voltage required by the selected phase shifting unit. In the present disclosure, when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, which can utilize the time already required for outputting the first phase shifting voltage, improve the efficiency of phase modulation, and increase the integration of the circuit system to which the phase shifting control circuit belongs, thereby reducing the size and power consumption of the circuit system.

In the phase-shifting control circuit of the present disclosure, the plurality of output terminals of the power output unit is coupled to the input terminal of the output channel through the power output switching switch. The introduction of the power output switching switch has the following advantages: when the first output terminal of the power output unit outputs the first phase shifting voltage to the first phase shifting unit that is currently coupled to the output terminal of the output channel, the output voltage of the second output terminal of the power output unit is modulated to the second phase shifting voltage required by the second phase shifting unit, which can utilize the time already required for outputting the first phase shifting voltage and improve the efficiency of phase modulation.

In the phase-shifting control circuit of the present disclosure, the output terminal of the output channel is sequentially coupled to each phase shifting unit in the predetermined order, and when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit. After the first phase shifting unit finishes phase modulation, the second output terminal of the power output unit is coupled to the input terminal of the output channel to output the second phase shifting voltage required by the second phase shifting unit to the second phase shifting unit. The above method has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, which can utilize the time already required for outputting the first phase shifting voltage and improve the efficiency of phase modulation.

In the phase-shifting control circuit of the present disclosure, the power output switching switch controls a selected output terminal of the output terminals of the power output unit to couple to the input terminal of the output channel, to output a phase shifting voltage to a selected phase shifting unit of the phase shifting units. The introduction of the power output switching switch has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, after the first phase shifting unit finishes phase modulation, the second output terminal of the power output unit outputs the second phase shifting voltage to the second phase shifting unit, which can utilize the time already required for outputting the first phase shifting voltage and can improve the efficiency of phase modulation.

In the phase-shifting control circuit of the present disclosure, by introducing the phase-shifting switching switch, a selected phase shifting unit is coupled to the output terminal of the output channel through the phase-shifting switching switch, to further improve the efficiency of phase modulation.

BRIEF DESCRIPTION OF THE DRAWINGS

FIGS. 1-3 are structural diagram of an optical phased array based on lithium niobate thin films for phase shifting control according to an embodiment of the present disclosure, wherein FIG. 2 is a cross-sectional structural view of the optical phased array, with the cutting plane passing through the line A-A' shown in FIG. 1, and FIG. 3 is a cross-sectional structural view of the optical phased array, with the cutting plane passing through the line B-B' shown in FIG. 1.

FIG. 4 is a flowchart of a method for preparing an optical phased array based on lithium niobate thin films for phase shifting control according to an embodiment of the present disclosure.

REFERENCE NUMERALS

Figures 1, 2:
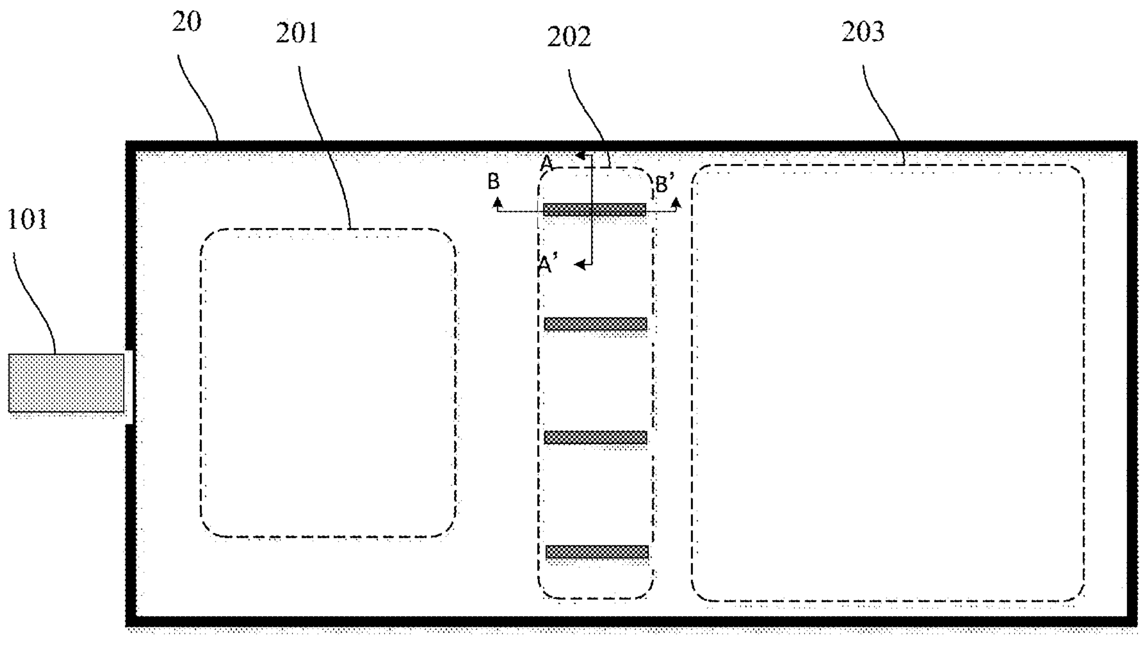

101 Laser
20 Optical phased array
201 Coupling beam splitter
202 lithium niobate phase shifter
203 Grating antenna
204 Control circuit
205 Power output unit
206 MOS transistor switching array
207 Capacitor array
208 Control unit
301 Silicon substrate
302 Silicon oxide layer
303 Optical waveguide layer
304 Silicon oxide cladding layer
305 Lithium niobate thin film
306 Lithium niobate optical waveguide
307 Band-shaped gap
308 Ground electrode
309 Control electrode
S11~S15 Steps
401 Diode
402 PMOS transistor
403 NMOS transistor
404 Resistor
11、21、31 Power output unit
12、22、32 Output channel
13、23、33 Output channel
14、24、34 Phase-shifting switching switch
25、35 Output terminal

26 Power output switching switch
331 Capacitor
332 Optical waveguide device
37 Control unit

DETAILED DESCRIPTION

The embodiments of the present disclosure will be described below. Those skilled in the art can easily understand other advantages and effects of the present disclosure according to contents disclosed by the specification. The present disclosure may also be implemented or applied through other different specific implementations. Various details in this specification may also be modified or changed based on different viewpoints and applications without departing from the spirit of the present disclosure.

For example, when describing the embodiments of the present disclosure in detail, for ease of description, a cross-sectional view for showing a device structure is partially enlarged not necessarily to scale, and the schematic diagram is merely an example and is not intended to limit the scope of the present disclosure. In addition, the three-dimensional spatial dimensions of length, width and depth should be included in the actual production.

For ease of description, spatial terms, such as “under”, “below”, “lower”, “beneath”, “above”, “upper”, and the like, may be used herein to describe the relationship between one element or feature and another element or feature as shown in the accompanying drawings. It is to be understood that these spatial terms are intended to encompass other directions of the device in use or operation than the directions depicted in the accompanying drawings. In addition, when a layer is referred to as being “between” two layers, the layer may be the only layer between the two layers, or one or more layers may be present therebetween.

In the context of this present disclosure, a structure in which a first feature is described as being “on” a second feature may include an embodiment in which the first feature and the second feature are in direct contact with each other, or may include an embodiment in which there is another feature formed between the first feature and the second feature. In other words, the first feature and the second feature may not be in direct contact with each other.

It should be noted that, the drawings provided in this embodiment only exemplify the basic idea of the present disclosure. Although only the components related to the present disclosure are shown in the drawings, they are not drawn according to the quantities, shapes, and sizes of the components during actual implementation. During actual implementation, the patterns, quantities, and proportions of the components may be changed as needed, and the layout of the components may be more complicated.

Embodiment 1

FIGS. 1-3 show an optical phased array 20 based on lithium niobate thin films for phase shifting control. The optical phased array 20 includes a silicon substrate 301, a silicon oxide layer 302, an optical waveguide layer 303, a silicon oxide cladding layer 304, and one or more lithium niobate phase shifters 202.

The silicon substrate 301 can be a monocrystalline silicon substrate. The silicon oxide layer 302 is disposed over the silicon substrate 301. The silicon oxide layer 302 is formed by a thermal oxidation growth process or other processes.

The optical waveguide layer 303 is disposed over the silicon oxide layer 302; the optical waveguide layer 303 includes a coupling beam splitter 201 and a grating antenna 203; a band-shaped gap 307 is set between the coupling beam splitter 201 and the grating antenna 203. A material of the optical waveguide layer 303 includes one of silicon and silicon nitride. In one embodiment, the material of the optical waveguide layer 303 is silicon.

As an example, the coupling beam splitter 201 includes multiple stages of 50:50 beam splitting units connected in series; the coupling beam splitter 201 includes an input terminal and a plurality of output terminals, and the output terminals of the coupling beam splitter 201 output light waves with the same light intensity. In one embodiment, as shown in FIG. 1, the coupling beam splitter 201 includes a first beam splitting unit, a second beam splitting unit, and a third beam splitting unit, the second beam splitting unit is connected to a first output terminal of the first beam splitting unit, the third beam splitting unit is connected to a second output terminal of the first beam splitting unit; that is the first beam splitting unit is the first stage, and the second beam splitting unit and the third beam splitting unit are the second stage; each beam splitting unit includes two optical channels and is used to split the light waves from one of the output terminals of the previous beam splitting unit into two light waves with the same light intensity. The coupling beam splitter 201 includes one input terminal and four output terminals in FIG. 1. In other embodiments, the coupling beam splitter 201 includes more stages of beam splitting units, for example, 3 stages, 4 stages, etc.

The grating antenna 203 includes a plurality of silicon-based antennas arranged in parallel and arranged at intervals; the number of the silicon-based antennas is the same as the number of the output terminals of the coupling beam splitter 201. The coupling beam splitter 201 and the grating antenna 203 are separated by the band-shaped gap 307; the region where the band-shaped gap 307 is located is used to accommodate one or more lithium niobate phase shifters 202.

The silicon oxide cladding layer 304 is disposed around the optical waveguide layer 303 and filled in the band-shaped gap 307. The top surface of the silicon oxide cladding layer 304 is level with the top surface of the optical waveguide layer 303, at least one terminal of the coupling beam splitter 201 and one terminal of the grating antenna 203 are exposed at two ends of the band-shaped gap 307 to facilitate connection between the lithium niobate phase shifters 202 and the coupling beam splitter 201 and the grating antenna 203, as shown in FIG. 3.

FIG. 2 is a cross-sectional structural view of the optical phased array, with the cutting plane passing through the line A-A' shown in FIG. 1, and FIG. 3 is a cross-sectional structural view of the optical phased array, with the cutting plane passing through the line B-B' shown in FIG. 1. As shown in FIG. 2, each lithium niobate phase shifter 202 includes a lithium niobate thin film 305 located in the band-shaped gap 307, a lithium niobate optical waveguide 306 disposed over the lithium niobate thin film 305 and connected to the coupling beam splitter 201 and the grating antenna 203, and modulation electrodes located on the lithium niobate film 305 on two sides of the lithium niobate optical waveguide 306. Each lithium niobate phase shifter 202 is used to modulate a phase of the light waves outputted by the coupling beam splitter 201 and output the modulated light waves to the grating antenna 203.

For example, the lithium niobate optical waveguide 306 is a ridged waveguide. The ridged waveguide extends along a straight line.

As shown in FIG. 3, each lithium niobate optical waveguide 306 is connected to one of the output terminals of the coupling beam splitter 201 and an input terminal of the grating antenna 203, and the lithium niobate optical waveguide 306 is located above and overlaps the output terminal of the coupling beam splitter 201 and the input terminal of the grating antenna 203. In an embodiment, the coupling beam splitter 201 includes a first-stage coupling beam splitter, a second-stage coupling beam splitter, . . . , and a Nth-stage coupling beam splitter, wherein the Nth-stage coupling beam splitter includes $2^{(N-1)}$ beam splitting units, N is an integer; each lithium niobate optical waveguide 306 is connected to a corresponding output terminal of the Nth-stage coupling beam splitter. The lithium niobate film 305 is in direct contact with the optical waveguide layer 303, and the propagation path of the light waves in the coupling beam splitter 201, the lithium niobate film 305, and the grating antenna 203 is shown by an arrow shown in FIG. 3.

As shown in FIG. 2, each of the modulation electrodes includes a ground electrode 308 and a control electrode 309, the ground electrode 308 is grounded, and the control electrode 309 is used to input a control signal, which is applied to two sides of a corresponding one of the lithium niobate optical waveguides 306 through the control electrode 309, to change refractive index of a light wave transmission region of the corresponding lithium niobate optical waveguide, thereby changing a phase of light waves during transmission.

In one embodiment, as shown in FIG. 1, The optical phased array 20 is also connected to an optical circulator and a laser 101. An output terminal of the optical circulator is connected to the input terminal of the coupling beam splitter 201, and an output terminal of the laser 101 is connected to an input terminal of the optical circulator. A light beam emitted by the laser 101 is a light beam with a narrow linewidth.

As shown in FIGS. 1-4, the present disclosure also provides a method for preparing the optical phased array 20 based on lithium niobate thin films for phase shifting control. The method includes steps S11-S15.

As shown in FIG. 4, S11 is first performed, which includes providing a silicon-on-insulator (SOI) substrate, wherein the SOI substrate includes the silicon substrate 301, the silicon oxide layer 302, and a silicon base layer.

Specifically, the silicon substrate 301 can be a monocrystalline silicon substrate. The silicon oxide layer 302 is disposed over the silicon substrate 301. The silicon oxide layer 302 is formed by a thermal oxidation growth process or other processes. Silicon or a silicon nitride layer with high refractive index is formed on the silicon oxide layer 302, to act as the silicon base layer.

As shown in FIG. 4, S12 is then performed, which includes etching the silicon base layer to form the optical waveguide layer 303; the optical waveguide layer 303 includes the coupling beam splitter 201 and the grating antenna 203, and the band-shaped gap 307 is set between the coupling beam splitter 201 and the grating antenna 203.

As shown in FIG. 4, S13 is then performed, which includes disposing the silicon oxide cladding layer 304 around the optical waveguide layer 303 and in the band-shaped gap 307.

As shown in FIG. 4, S14 is then performed, which includes bonding the lithium niobate layer on the optical waveguide layer 303 and the silicon oxide cladding layer 304, and etching the lithium niobate layer to form a lithium niobate thin film 305 over the band-shaped gap 307 and a lithium niobate optical waveguide 306 connecting the coupling beam splitter 201 and the grating antenna 203.

As shown in FIG. 4, S15 is performed, which includes preparing modulation electrodes on the lithium niobate thin film 305 on two sides of the lithium niobate optical waveguide 306 to form a lithium niobate phase shifter. For example, the modulation electrodes are prepared by adopting a metal sputtering process, an etching process, or a metal stripping process.

The present disclosure also provides a method of applying the optical phased array 20 based on lithium niobate thin films for phase shifting control. The structure of the optical phased array 20 based on lithium niobate thin films for phase shifting control is shown in the above embodiments. The method includes:

Step 1), outputting, by the laser 101, the light beam with a narrow linewidth to the input terminal of the coupling beam splitter 201, and splitting, by the coupling beam splitter 201, the light beam into multiple channels of light waves.

In one embodiment, the laser 101 outputs the light beam to the coupling beam splitter 201, the coupling beam splitter 201 splits the light beam into multiple channels of light waves, and each channel of light waves has the same light intensity.

Step 2), for each channel of the light waves, performing phase-modulation on the light waves after them enter a corresponding one of the one or more lithium niobate phase shifters 202 so that there is a predetermined phase-shift among the light waves.

In one embodiment, after the light waves enter a corresponding lithium niobate phase shifter 202, based on an electro-optic effect of lithium niobate, exerting a control signal on the modulation electrodes to change refractive index of lithium niobate in the corresponding lithium niobate phase shifter 202, so that the phase of light waves in the corresponding lithium niobate phase shifter 202 is shifted through phase-modulation. In an embodiment, after the phase of light waves are modulated by the lithium niobate phase shifters 202, the shifted phase of the light waves is different in each channel.

Step 3), for each channel of the light waves, outputting light waves with a certain phase to the grating antenna 203, and emitting, the light waves with the certain phase, by the grating antenna 203, into space at a predetermined angle.

Figure 5:
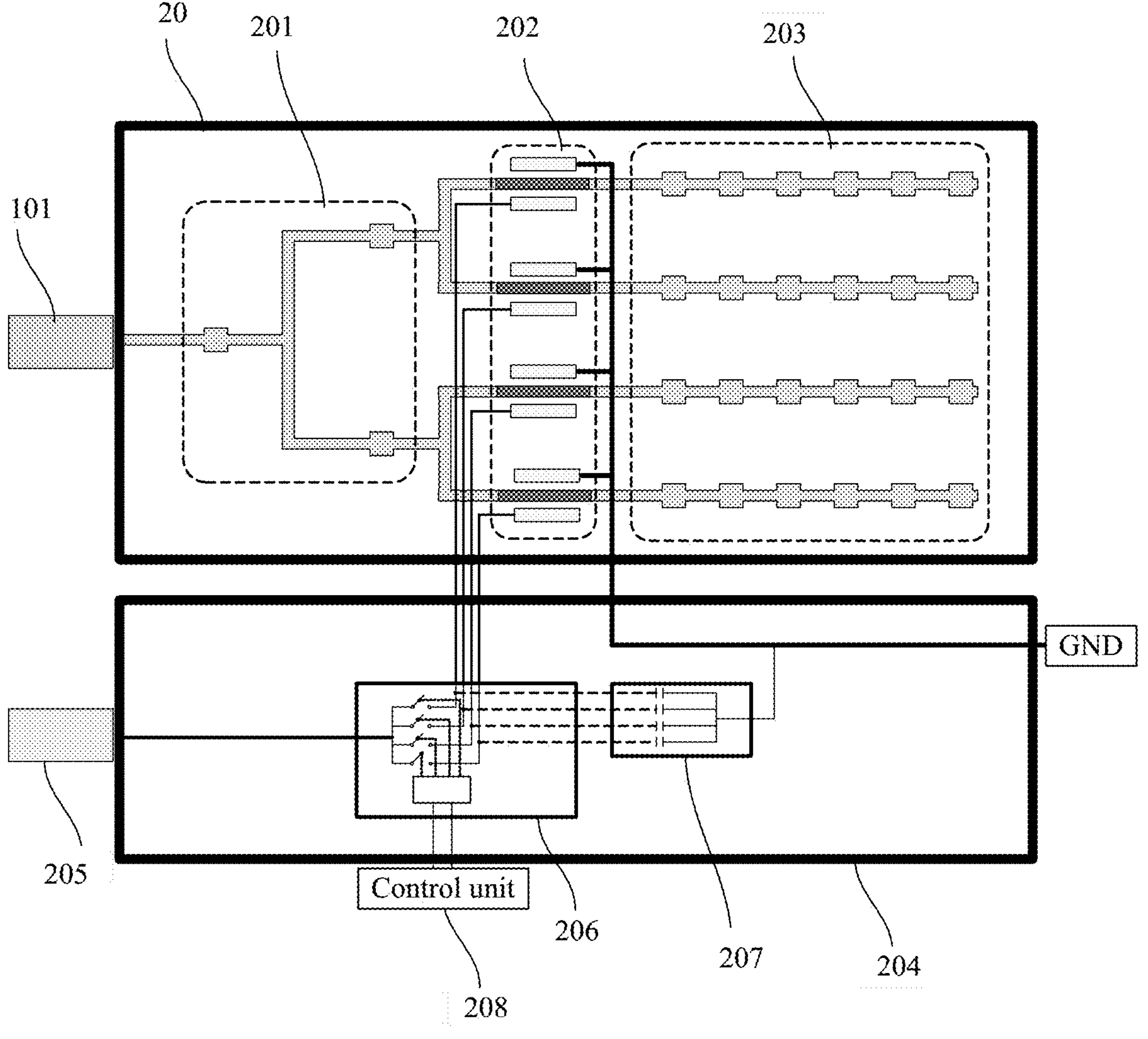
FIG. 5 is an architecture diagram of a phase-shifting control system based on lithium niobate thin films according to an embodiment of the present disclosure.
Figure 6:
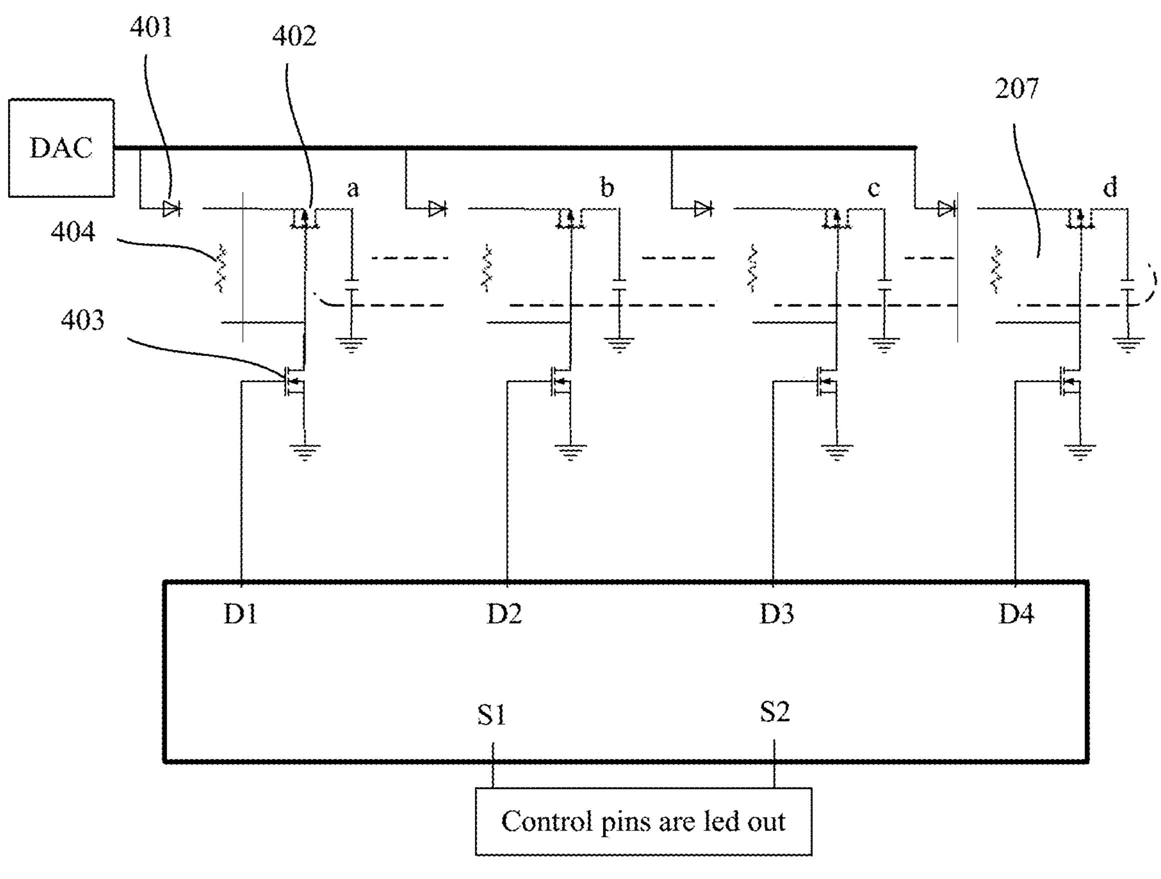
FIG. 6 is an architecture diagram of a control circuit of a phase-shifting control system based on lithium niobate thin films according to an embodiment of the present disclosure.

As shown in FIGS. 5-6, the present disclosure also provides the optical phased array system based on lithium niobate thin films. The optical phased array system includes the optical phased array based on lithium niobate thin films for phase shifting control as described above and a control circuit 204. The control circuit 204 includes a power output unit 205, a metal-oxide-semiconductor (MOS) transistor switching array 206, a capacitor array 207, and a control unit 208. The power output unit 205 is used to output a voltage. The MOS transistor switching array 206 is connected between the power output unit 205 and a control electrode of the optical phased array, providing a phase shifting channel for the optical phased array. Two terminals of each capacitor unit of the capacitor array 207 are connected to the control electrode and a ground electrode of the optical phased array respectively. The control unit 208 is used to provide logic and timing control for the optical phased array system through a control bus.

The control circuit 204 is fabricated into a control chip by adopting a CMOS process and bonded with the optical phased array chip based on lithium niobate thin films for phase shifting control by adopting a three-dimensional integration process, to obtain the optical phased array system based on lithium niobate thin films, thereby greatly reducing the size of the optical phased array system.

In an embodiment, as shown in FIG. 6, the MOS transistor switching array 206 includes a plurality of MOS transistor switching units. Each MOS transistor switching unit includes a diode 401, a PMOS transistor 402, an NMOS transistor 403, and a resistor 404. One diode 401 is set in each phase shifting channel and is used to isolate currents in the phase shifting channels from each other; a first terminal of each PMOS transistor 402 is connected to the corresponding diode 401, a second terminal of each PMOS transistor 402 is connected to a terminal of a capacitor unit of the corresponding capacitor array 207, a gate of each PMOS transistor 402 is connected to a first terminal of the corresponding NMOS transistor 403, a second terminal of each NMOS transistor 403 is grounded, a gate of each NMOS transistor 403 is connected to the control bus, and each resistor 404 is connected between the first terminal and the gate of the corresponding PMOS transistor 402. The control bus includes multiple control pins shown in FIG. 6.

As shown in FIG. 6, in the MOS transistor switching array 206, one diode 401 is set in each phase shifting channel, and is used to isolate currents in the phase shifting channels from each other. For any of the MOS transistor switching units, the NMOS transistor 403 is turned off when the gate of the NMOS transistor 403 is a low level, and the PMOS transistor 402 is also turned off under the effect of the resistor 404, in which case the voltage of the power output unit remains in the previous output state; when a high level is exerted on the gate of the NMOS transistor 403 through a corresponding control pin, the NMOS transistor 403 is turned on, so that a low level is exerted on the gate of the PMOS transistor 402 and the PMOS transistor 402 is turned on, at which time, the voltage of the power output unit (e.g., a DAC) is stored in a corresponding capacitor, and the voltage controls a phase adjusted by the corresponding phase shifting unit (e.g., the voltages at the nodes a, b, c and d in FIG. 6 are outputted to corresponding phase shifting units respectively). Based on the above configuration, a first MOS transistor switching unit of the MOS transistor switching array 206 is connected to a first modulation channel of the optical phased array through the control pins, the voltage of the power output unit is stored in the corresponding capacitor, and then a second MOS transistor switching unit of the MOS transistor switching array is connected to a second modulation channel of the optical phased array through the control pins. For each channel of the light waves, phase-modulation is performed on the light waves after them enter a corresponding one of the one or more lithium niobate phase shifters so that there is a predetermined phase-shift among the light waves. After the light waves in each channel reaches a certain phase, a beam with a specific waveform and deflection direction will be emitted by the grating antenna of the optical phased array.

Embodiment 2

Figure 7:
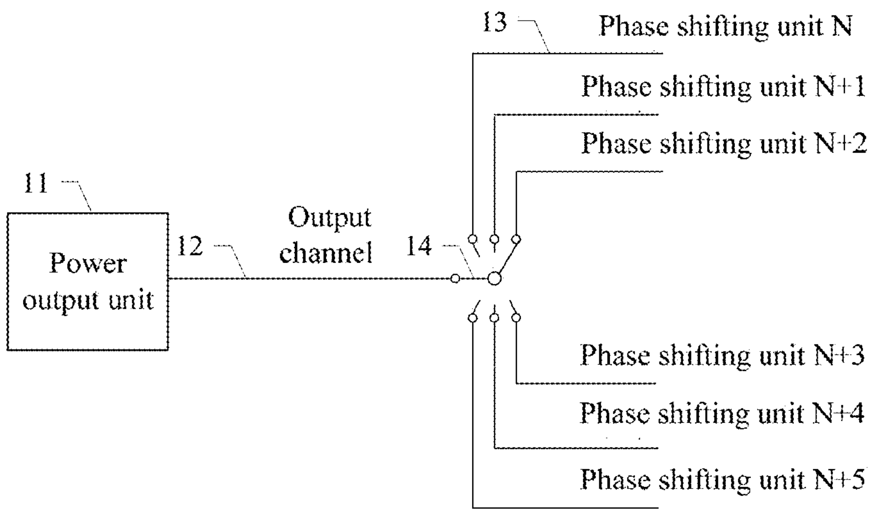
FIG. 7 is a circuit diagram of a phase-shifting control circuit according to an embodiment of the present disclosure.

FIG. 7 is a circuit diagram of a phase-shifting control circuit in the prior art.

As shown in FIG. 7, the phase-shifting control circuit includes a power output unit 11, an output channel 12, and a phase shifting unit array.

The phase shifting unit array includes a plurality of phase shifting units 13. An output terminal of the output channel 12 is configured to be coupled to one of the plurality of phase shifting units 13. The power output unit 11 is coupled to an input terminal of the output channel 12, and outputs a phase shifting voltage to the phase shifting unit array through the output channel 12. Each phase shifting unit 13 is used to modulate a phase of the light waves.

In an embodiment, the plurality of phase shifting units 13 includes a phase shifting unit N, a phase shifting unit N+1, a phase shifting unit N+2, a phase shifting unit N+3, a phase shifting unit N+4, and a phase shifting unit N+5, wherein N is an integer. It should be noted that six phase shifting units 13 in FIG. 7 are only an example.

In an embodiment, the phase-shifting control circuit further includes a phase-shifting switching switch 14. The phase-shifting switching switch 14 has a phase-shifting input terminal and a plurality of phase-shifting output terminals. The output terminal of the output channel 12 is sequentially coupled to each phase shifting unit 13 through the phase-shifting switching switch 14, wherein at a given time the output terminal of the output channel 12 is coupled to at most one phase shifting unit 13.

In the phase-shifting control circuit shown in FIG. 7, a phase shifting method includes: the phase-shifting output terminal of the phase-shifting switching switch 14 is switched to connect with a first phase shifting unit (i.e., a designated phase shifting unit) of the phase shifting units 13, an output voltage of by the power output unit 11 is modulated to a first preset value after a preset time period, and then the first preset value is outputted to the first phase shifting unit. After that, the phase-shifting output terminal of the phase-shifting switching switch 14 is switched to connect with a second phase shifting unit of the phase shifting units 13, the output voltage of the power output unit 11 is modulated to a second preset value after a preset time period, and then the second preset value is outputted to the second phase shifting unit. It should be noted that the preset time period may be the time it takes to build up the DAC chip (e.g., the power output unit 11 in FIG. 7) voltage and a charging time (e.g., product of R and C, R represents the resistance value of the resistor of the phase shifter, C represents the capacitance value of the capacitor of the phase shifter).

The above phase shifting method requires switching the phase-shifting output terminal of the phase-shifting switching switch 14, then adjusting the output voltage of the power output unit 11, and sending a preset value to a selected phase shifting unit. Since it takes a long time to adjust the output voltage of the power output unit 11, the efficiency of phase modulation is low, which even leads to lack of stability of the circuit system to which the phase-shifting control circuit belongs.

In the present disclosure, the power output unit includes a plurality of output terminals; each output terminal is used to output an output voltage; the input terminal of the output channel is coupled to one of the plurality of output terminals of the power output unit; the output terminal of the output channel is configured to be coupled to one of the plurality of phase shifting units. In the prior art, the power output unit only has one output terminal; when the output terminal of the power output unit outputs the output voltage to the output channel, the output channel needs to be connected to a selected phase shifting unit first, and then it takes time to adjust the output voltage to the phase-shifting voltage required by the selected phase shifting unit. In the present disclosure, while the first output terminal of the power output unit outputs a first phase shifting voltage to the first phase shifting unit that is currently coupled to the output terminal of the output channel, the output voltage of the second output terminal of the power output unit is modulated to be the second phase shifting voltage required by the second phase shifting unit, which can utilize the time already required for outputting the first phase shifting voltage, improve the efficiency of phase modulation, and increase the integration of the circuit system to which the phase-shifting control circuit belongs, thereby reducing the size and power consumption of the circuit system.

In order to make the above-mentioned purposes, features, and beneficial effects of the present disclosure more obvious and understandable, the following specific embodiments of the present disclosure are described in detail in conjunction with the accompanying drawings.

Figure 8:
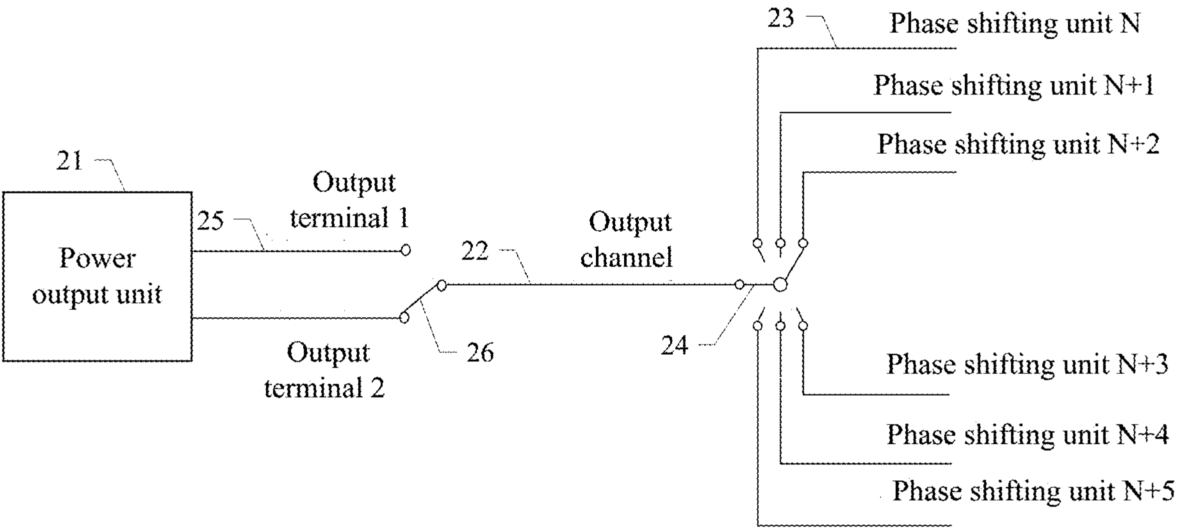
FIG. 8 is a circuit diagram of a phase-shifting control circuit according to an embodiment of the present disclosure.

Referring to FIG. 8, FIG. 8 is a circuit diagram of the phase-shifting control circuit.

As shown in FIG. 8, the phase-shifting control circuit includes a power output unit 21, an output channel 22, and a phase shifting unit array.

The power output unit 21 has a plurality of output terminals 25 (e.g., an output terminal 1 and an output terminal 2). Each output terminal is used to output an output voltage, that is, output voltages at the output terminals 25 of the power output unit 21 can be different. The phase shifting unit array includes a plurality of phase shifting units 23. Each phase shifting unit is used to modulate a phase of the light waves.

In an embodiment, the plurality of phase shifting units 23 includes a phase shifting unit N, a phase shifting unit N+1, a phase shifting unit N+2, a phase shifting unit N+3, a phase shifting unit N+4, and a phase shifting unit N+5, wherein N is an integer. It should be noted that six phase shifting units 23 in FIG. 8 are only an example.

In an embodiment, the input terminal of the output channel 22 is coupled to one of the plurality of output terminals of the power output unit 21 (for example, the output terminal 2 in FIG. 8), and the output terminal of the output channel 22 is coupled to one of the plurality of phase shifting units 23.

In an embodiment of the present disclosure, the power output unit 21 includes a plurality of output terminals; each output terminal is used to output an output voltage; the input terminal of the output channel is coupled to one of the plurality of output terminals of the power output unit; the output terminal of the output channel is coupled to one of the plurality of phase shifting units. In the prior art, the power output unit only has one output terminal; when the output terminal of the power output unit outputs the output voltage to the output channel, the output channel needs to be connected to a selected phase shifting unit first, and then it takes extra time to adjust the output voltage to the phase-shifting voltage required by the selected phase shifting unit. In the present disclosure, when the first output terminal of the power output unit outputs the first phase shifting voltage to the first phase shifting unit that is currently coupled to the output terminal of the output channel, the output voltage at the second output terminal of the power output unit is modulated to be the second phase shifting voltage required by the second phase shifting unit; this kind of arrangement can utilize the time already required for outputting the first phase shifting voltage, improve the efficiency of phase modulation, and increase the integration of the circuit system to which the phase-shifting control circuit belongs, thereby reducing the size and power consumption of the circuit system.

The phase shifting control circuit further includes a power output switching switch 26. The power output switching switch 26 is provided with a plurality of phase-shifting input terminals and one phase-shifting output terminal. The plurality of output terminals 25 of the power output unit 21 are coupled to the input terminal of the output channel 22 through the power output switching switch 26.

In an embodiment of the present disclosure, the plurality of output terminals of the power output unit is coupled to the input terminal of the output channel through the power output switching switch 26. The introduction of the power output switching switch 26 has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, which can effectively use the time for outputting the first phase shifting voltage and improve the efficiency of phase modulation.

In an embodiment, the output terminal of the output channel 22 is sequentially coupled to each phase shifting unit 23 in a predetermined order, and when the first output terminal of the power output unit 21 outputs the first phase shifting voltage to the first phase shifting unit that is currently coupled to the output terminal of the output channel, the output voltage of the second output terminal of the power output unit is modulated to be the second phase shifting voltage required by the second phase shifting unit; after the preset time period, the second output terminal of the power output unit is coupled to the input terminal of the output channel to output the second phase shifting voltage required by the second phase shifting unit to the second phase shifting unit.

It should be noted that the length of the preset time period can be the time to adjust the phase of the light waves by the first phase shifting unit or by the second phase shifting unit.

In an embodiment, each phase shifting unit includes a capacitor. When the first output terminal of the power output unit outputs the first phase shifting voltage required by the first phase shifting unit to the capacitor of the first phase shifting unit, the second output terminal of the power output unit is coupled to the input terminal of the output channel to output the second phase shifting voltage required by the second phase shifting unit. At this time, the first phase shifting unit can still use the voltage stored in its capacitor for phase modulation.

In other embodiments, each phase shifting unit does not include a capacitor, in which case the preset time period is a time period from time t1 to time t2, wherein the time t1 is a time when the first phase shifting voltage is outputted to the first phase shifting unit, and the time t2 is a time when the second output terminal of the power output unit is coupled to the output channel.

It should be noted that the second output terminal is one of the output terminals of the power output unit other than the first output terminal.

In an embodiment, the output terminal of the output channel 22 is sequentially coupled to each phase shifting unit 23 in the predetermined order, and when the first output terminal of the power output unit 21 outputs the first phase shifting voltage to the first phase shifting unit that is currently coupled to the output terminal of the output channel, the output voltage of the second output terminal of the power output unit is modulated to be the second phase shifting voltage required by the second phase shifting unit, after the preset time period, the second output terminal of the power output unit is coupled to the input terminal of the output channel to output the second phase shifting voltage required by the second phase shifting unit to the second phase shifting unit. The above method has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, which can effectively use the time for outputting the first phase shifting voltage and improve the efficiency of phase modulation.

The phase-shifting control circuit further includes a power output switching switch (not shown in the figures). The power output switching switch is used to control a selected output terminal of the output terminals of the power output unit 21 to couple to the input terminal of the output channel 22, to output the phase shifting voltage to a selected phase shifting unit of the phase shifting units.

Specifically, when the output voltage of the power output unit 21 is modulated to be the phase shifting voltage required by the selected phase shifting unit and the phase shifting voltage is outputted to one of the output terminals 25 of the power output unit 21, the input terminal of the output channel 22 is controlled to couple to the output terminal of the power output unit 21.

In the phase shifting control circuit shown in FIG. 8, the power output unit 21 includes two output terminals, that is, the output terminal 1 and the output terminal 2. The power output switching switch 26 is a single knife double-throw switch.

In an embodiment, the first output terminal (e.g., the output terminal 2) of the power output unit 21 is set to output the first phase-shifting voltage to the first phase shifting unit (e.g., the phase shifting unit N+2) that is currently coupled to the output terminal of the output channel, the output voltage of the second output terminal (e.g., the output terminal 1) of the power output unit is modulated to be the second phase shifting voltage required by the second phase shifting unit (e.g., the phase shifting unit N+3), after the preset time period, the second output terminal of the power output unit is coupled to the input terminal of the output channel to output the second phase shifting voltage required by the second phase shifting unit to the second phase shifting unit.

In an embodiment, the power output switching switch controls a selected output terminal of the output terminals of the power output unit to couple to the input terminal of the output channel, to output the phase shifting voltage to a selected phase shifting unit of the phase shifting units. The introduction of the power output switching switch has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, after the first phase shifting unit finishes the phase modulation, the second output terminal of the power output unit outputs the second phase shifting voltage to the second phase shifting unit, which can utilize the time already required for outputting the first phase shifting voltage and can improve the efficiency of phase modulation.

In an embodiment, the phase-shifting control circuit further includes a phase-shifting switching switch 24. The phase-shifting switching switch 24 has a phase-shifting input terminal and a plurality of phase-shifting output terminals. The output terminal of the output channel 22 is sequentially coupled to each phase shifting unit through the phase-shifting switching switch 24, wherein at a given time the output terminal of the output channel 22 is coupled to at most one phase shifting unit 23.

In an embodiment of the preset disclosure, the phase-shifting switching switch 24 is set to enable a selected phase shifting unit to couple to the output terminal of the output channel, thereby improving the efficiency of phase modulation.

In an embodiment, the phase-shifting control circuit further includes a phase-shifting switching switch 24. The phase-shifting switching switch 24 is used to control the output terminal of the output channel 22 to couple to a corresponding phase shifting unit 23 according to the predetermined order.

In the phase-shifting control circuit shown in FIG. 8, the phase shifting units 23 includes a phase shifting unit N, a phase shifting unit N+1, a phase shifting unit N+2, a phase shifting unit N+3, a phase shifting unit N+4, and a phase shifting unit N+5, wherein N is an integer. The phase-shifting switching switch 24 is a single knife multiple-throw switch.

In an embodiment, when the first output terminal (e.g., the output terminal 2) of the power output unit 21 needs to output the first phase-shifting voltage required by the first phase shifting unit (e.g., the phase shifting unit N+2) to the first phase shifting unit, the input terminal of the output channel 22 is controlled to couple to the first output terminal (e.g., the output terminal 2) of the power output unit 21 and the output terminal of the output channel 22 is controlled to couple to the first phase shifting unit (e.g., the phase shifting unit N+2), to output the first phase-shifting voltage to the first phase shifting unit (e.g., the phase shifting unit N+2) for phase shifting.

At this time, the output voltage at the second output terminal (e.g., the output terminal 1) of the power output unit 21 is modulated to be the second phase shifting voltage required by the second phase shifting unit (e.g., the phase shifting unit N+3), after the preset time period, the second output terminal of the power output unit 21 is coupled to the input terminal of the output channel 22 and the output terminal of the output channel 22 is controlled to couple to the second phase shifting unit (e.g., the phase shifting unit N+3), to output the second phase shifting voltage required by the second phase shifting unit (e.g., the phase shifting unit N+3) to the second phase shifting unit.

In an embodiment, by introducing the phase-shifting switching switch 24, one of the phase shifting units 23 can be selected to couple to the output channel, thereby improving the efficiency of phase modulation.

In the phase-shifting control circuit shown in FIG. 8, the phase shifting method includes: the output voltage at the output terminal 2 of the power output unit 21 is modulated to be the first phase-shifting voltage required by the phase shifting unit N+2 after a preset time period, the power output switching switch 26 is switched to enable the input terminal of the output channel 22 to couple to the output terminal 2 of the power output unit 21 and the phase-shifting output terminal of the phase-shifting switching switch 24 is switched to couple to the phase shifting unit N+2, to output the first phase shifting voltage to the phase shifting unit N+2 for phase modulation.

When the phase shifting unit N+2 adjusts the phase of the light waves under the control of the first phase shifting voltage, the output voltage at the output terminal 1 of the power output unit 21 is modulated to be the second phase-shifting voltage required by the phase shifting unit N+3 after a preset time period. It should be noted that the preset time perioday be the time it takes to build up the DAC chip voltage or a charging time of Resistance-Capacitance (RC).

When the second phase shifting voltage is stabilized to the preset value and the first phase-shifting voltage is outputted to the phase shifting unit N+2, the phase-shifting output terminal of the power output switching switch 26 is switched to couple to the phase shifting unit N+3, to output the second phase-shifting voltage required by the phase shifting unit N+3 to the phase shifting unit N+3 for phase modulation.

In one embodiment of the present disclosure, the power output unit 21 includes a plurality of output terminals 25; each output terminal 25 is used to output the output voltage; the input terminal of the output channel 22 is coupled to one of the plurality of output terminals 25 of the power output unit 21; the output terminal of the output channel 22 is coupled to one of the plurality of phase shifting units 23. In the prior art, the power output unit only has one output terminal; when the output terminal of the power output unit outputs a phase shifting voltage to the output channel, the output channel needs to be connected to a selected phase shifting unit first, and then it takes time to adjust the output voltage to the phase-shifting voltage required by the selected phase shifting unit. In the present disclosure, when the first output terminal of the power output unit outputs the first phase shifting voltage to the first phase shifting unit that is currently coupled to the output terminal of the output channel, the output voltage at the second output terminal of the power output unit is modulated to be the second phase shifting voltage required by the second phase shifting unit, which can utilize the time already required for outputting the first phase shifting voltage and improve the efficiency of phase modulation and increase the integration of the circuit system to which the phase shifting control circuit belongs, thereby reducing the size and power consumption of the circuit system.

Figure 9:
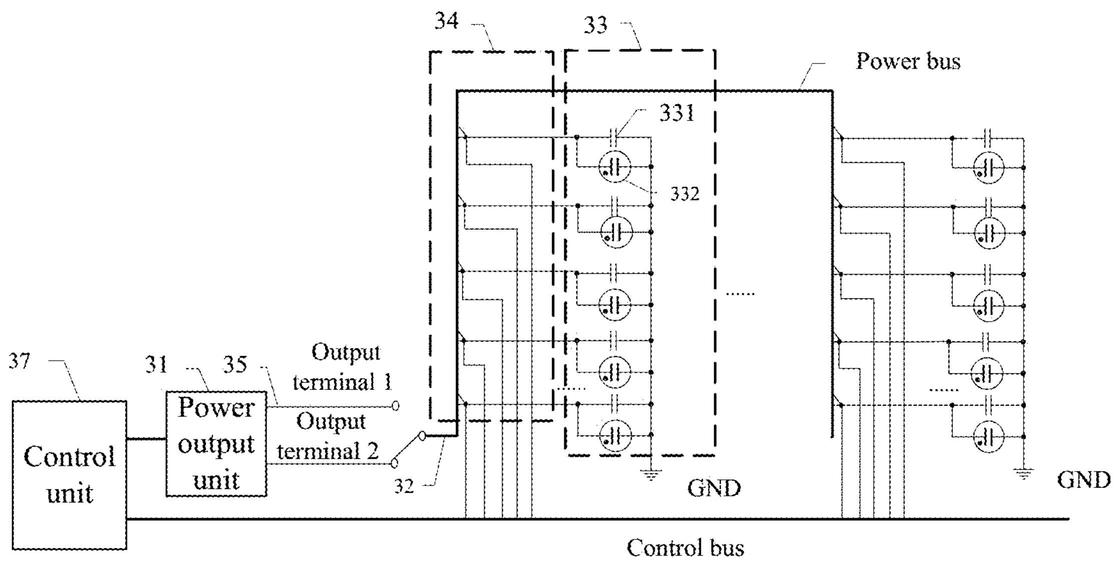
FIG. 9 is a circuit diagram of a phase-shifting control circuit according to an embodiment of the present disclosure.

Referring to FIG. 9, FIG. 9 is a circuit diagram of a phase shifting control circuit according to another embodiment of the present disclosure.

As shown in FIG. 9 the phase-shifting control circuit includes a power output unit 31, an output channel 32, a plurality of phase shifting units 33 and a phase-shifting switching switch 34.

The power output unit 31 includes a plurality of output terminals 35. For example, the power output unit 31 includes an output terminal 1 and an output terminal 2.

Each phase shifting unit 33 includes a capacitor 331, and an optical waveguide device 332. The optical waveguide device 332 corresponds to the capacitor 331 one by one, and the optical waveguide device 332 and the capacitor 331 are connected in parallel.

In an embodiment of the present disclosure, each phase shifting unit 33 is set to include the capacitor 331 and the optical waveguide device 332 connected in parallel, to realize the function of phase shifting and improve the efficiency of the phase modulation.

The optical waveguide devices 332 can be made of suitable optical waveguide materials, for example, silicon (Si) waveguide materials or suitable piezoelectric materials.

In an embodiment, the optical waveguide device 332 is a lithium niobate ($LiNbO_3$) optical waveguide device. For example, the optical waveguide device 332 may be the optical phased array based on lithium niobate thin films for phase shifting control, which is described in Embodiment 1.

In an embodiment, by introducing the lithium niobate optical waveguide device, light waves can be better confined and conducted, and the stability of the circuit system to which the phase shifting control circuit belongs can be improved.

In an embodiment, the phase-shifting control circuit includes a control unit 37. The control unit 37 is used to provide logic and timing control for the phase-shifting control circuit through a control bus.

In an embodiment of the present disclosure, the control unit 37 provides logic and timing control for the phase shifting control circuit to further improve the efficiency of phase modulation.

In an embodiment, the phase-shifting control circuit is applied to phase-shifting control systems for silicon-based optical phased arrays, photonic artificial intelligence, micro-electro-mechanical system (MEMS) switches, and piezo-electric materials.

The phase-shifting control circuit shown in FIG. 9 can be applied to the silicon-based optical phased array.

The phase-shifting control circuit can significantly reduce the power consumption of phase-shifting control and high-speed array control. The control system adopts simple basic electronic devices, simple design, simple process, which is easy to batch production and effectively reduces the cost.

The phase-shifting control circuit can be built with separate components or integrated into a single chip, thus contributing to a flexible and easy circuit control.

Although the present disclosure is disclosed as above, the present disclosure is not limited therein. Any person skilled in the art may make various changes and modifications without departing from the spirit and scope of the present disclosure, and therefore the scope of protection of the present disclosure shall be subject to the scope defined by the claims.

As described above, the optical phased array based on lithium niobate thin films for phase shifting control, the method for preparing the optical phased array based on lithium niobate thin films and the phase-shifting control system of the present disclosure have the following beneficial effects:

The present disclosure provides a novel optical phase shifter based on lithium niobate thin films and applies the optical phase shifter to silicon-based optical phased arrays. In the present disclosure, materials with high electro-optical coefficient and low loss, such as lithium niobate, replace thermal modulation resistors and the phase modulation mode based on carrier injection used in conventional optical phased arrays, so that optical phase modulation with low power consumption, high speed and low waveguide loss can be performed by optical phased arrays.

In the present disclosure, the lithium niobate thin film is attached to the optical phased array by adopting a bonding process, then the lithium niobate thin film is etched to form the optical waveguide, and finally the modulation electrodes for shifting an optical phase of light waves are formed on the surface of the lithium niobate thin film by adopting a sputtering process. The modulation electrodes is used to modulate the loading of the signal through the low half-wave voltage that the lithium niobate thin film phase shifter has. Besides, the present disclosure can be combined with conditional CMOS processes to achieve low optical transmission loss and high modulation speed, which can greatly enhance the power of the light waves emitted by the silicon-based optical phased arrays and the scanning speed of silicon-based optical phased arrays and improve the performance of the optical phased arrays.

In the present disclosure, due to the fact that lithium niobate thin film phase shifters have high impedance and low power consumption, the MOS transistor switching array is used to control the electric field control voltage by scanning, which can greatly reduce the complexity of the system and improve the integratability.

In the present disclosure, the control circuit is fabricated into a control chip by adopting a CMOS process and bonded with the optical phased array chip based on lithium niobate thin films by adopting a three-dimensional integration process, to greatly reduce the size of the system.

In the phase-shifting control circuit of the present disclosure, the power output unit includes a plurality of output terminals; each output terminal is used to output an output voltage; the input terminal of the output channel is coupled to one of the plurality of output terminals of the power output unit; the output terminal of the output channel is coupled to one of the plurality of phase shifting units. In the prior art, the power output unit only has one output terminal; when the output terminal of the power output unit outputs a phase shifting voltage to the output channel, the output channel needs to be connected to a selected phase shifting unit first, and then it takes time to adjust the output voltage to the phase-shifting voltage required by the selected phase shifting unit. In the present disclosure, when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, which can utilize the time already required for outputting the first phase shifting voltage, improve the efficiency of phase modulation, and increase the integration of the circuit system to which the phase shifting control circuit belongs, thereby reducing the size and power consumption of the circuit system.

In the phase-shifting control circuit of the present disclosure, the plurality of output terminals of the power output unit is coupled to the input terminal of the output channel through the power output switching switch. The introduction of the power output switching switch has the following advantages: when the first output terminal of the power output unit outputs the first phase shifting voltage to the first phase shifting unit that is currently coupled to the output terminal of the output channel, the output voltage of the second output terminal of the power output unit is modulated to the second phase shifting voltage required by the second phase shifting unit, which can utilize the time already required for outputting the first phase shifting voltage and improve the efficiency of phase modulation.

In the phase-shifting control circuit of the present disclosure, the output terminal of the output channel is sequentially coupled to each phase shifting unit in the predetermined order, and when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit. After the first phase shifting unit finishes phase modulation, the second output terminal of the power output unit is coupled to the input terminal of the output channel to output the second phase shifting voltage required by the second phase shifting unit to the second phase shifting unit. The above method has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, which can utilize the time already required for outputting the first phase shifting voltage and improve the efficiency of phase modulation.

In the phase-shifting control circuit of the present disclosure, the power output switching switch controls a selected output terminal of the output terminals of the power output unit to couple to the input terminal of the output channel, to output a phase shifting voltage to a selected phase shifting unit of the phase shifting units. The introduction of the power output switching switch has the following advantages: when the first output terminal of the power output unit outputs the first phase shifting voltage to the first phase shifting unit that is currently coupled to the output terminal of the output channel, the output voltage of the second output terminal of the power output unit is modulated to be the second phase shifting voltage required by the second phase shifting unit, after the first phase shifting unit finishes phase modulation, the second output terminal of the power output unit outputs the second phase shifting voltage to the second phase shifting unit, which can utilize the time already required for outputting the first phase shifting voltage and can improve the efficiency of phase modulation.

In the phase-shifting control circuit of the present disclosure, by introducing the phase-shifting switching switch, a selected phase shifting unit is coupled to the output terminal of the output channel through the phase-shifting switching switch and, to further improve the efficiency of phase modulation.

The above embodiments are illustrative of the principles and benefits of the disclosure rather than restrictive of the scope of the disclosure. Persons skilled in the art can make modifications and changes to the embodiments without departing from the spirit and scope of the disclosure. Therefore, all equivalent modifications and changes made by persons skilled in the art without departing from the spirit and technical concepts disclosed in the disclosure shall still be deemed falling within the scope of the claims of the disclosure.

What is claimed is:

1. An optical phased array based on lithium niobate thin films for phase shifting control, wherein the optical phased array comprises:

a silicon substrate;

a silicon oxide layer, disposed over the silicon substrate;

an optical waveguide layer, disposed over the silicon oxide layer; wherein the optical waveguide layer comprises a coupling beam splitter and a grating antenna that are spaced apart by a band-shaped region;

a silicon oxide cladding layer, disposed over the silicon oxide layer and around the coupling beam splitter and the grating antenna, wherein a part of the silicon oxide cladding layer constitutes the band-shaped gapregion, wherein a top surface of the silicon oxide cladding layer is level with a top surface of the optical waveguide layer; and one or more lithium niobate phase shifters; wherein each lithium niobate phase shifter comprises: a lithium niobate thin film located over the band-shaped region; a lithium niobate optical waveguide disposed over the lithium niobate thin film and connected to the coupling beam splitter and the grating antenna; and modulation electrodes, wherein the modulation electrodes are located on the lithium niobate thin film on two sides of the lithium niobate optical waveguide.

2. The optical phased array based on lithium niobate thin films for phase shifting control according to claim 1, wherein the optical phased array is connected to a laser, wherein an output terminal of the laser is connected to an input terminal of the coupling beam splitter.

3. The optical phased array based on lithium niobate thin films for phase shifting control according to claim 1, wherein the coupling beam splitter comprises a plurality stages of 50:50 beam splitting units connected in series; wherein the coupling beam splitter comprises an input terminal and a plurality of output terminals, and the output terminals of the coupling beam splitter output light waves with the same light intensity.

4. The optical phased array based on lithium niobate thin films for phase shifting control according to claim 1, wherein each lithium niobate optical waveguide is connected to one of the output terminals of the coupling beam splitter and an input terminal of the grating antenna, and the lithium niobate optical waveguide is located above and overlaps the output terminal of the coupling beam splitter and the input terminal of the grating antenna.

5. The optical phased array based on lithium niobate thin films for phase shifting control according to claim 1, wherein a material of the optical waveguide layer comprises one of silicon and silicon nitride.

6. The optical phased array based on lithium niobate thin films for phase shifting control according to claim 1, wherein the lithium niobate optical waveguide is a ridged waveguide.

7. The optical phased array based on lithium niobate thin films for phase shifting control according to claim 1, wherein each of the modulation electrodes comprises a ground electrode and a control electrode, wherein the ground electrode is grounded, and the control electrode is used to input a control signal, which is applied to two sides of a corresponding one of the lithium niobate optical waveguides through the control electrode, to change refractive index of a light wave transmission region of the corresponding lithium niobate optical waveguide, thereby changing a phase of light waves during transmission.

8. A method for preparing an optical phased array based on lithium niobate thin films for phase shifting control according to claim 1, comprising:

1) providing a silicon-on-insulator (SOI) substrate, wherein the SOI substrate comprises a silicon substrate, a silicon oxide layer, and a silicon base layer;
2) etching the silicon base layer to form an optical waveguide layer, wherein the optical waveguide layer comprises a coupling beam splitter and a grating antenna, and a band-shaped gap is set between the coupling beam splitter and the grating antenna;
3) disposing a silicon oxide cladding layer around the optical waveguide layer and in the band-shaped gap;
4) bonding a lithium niobate layer on the optical waveguide layer and the silicon oxide cladding layer, and etching the lithium niobate layer to form a lithium niobate thin film over the band-shaped gap and a lithium niobate optical waveguide connecting the coupling beam splitter and the grating antenna; and
5) preparing modulation electrodes on the lithium niobate thin film on two sides of the lithium niobate optical waveguide to form a lithium niobate phase shifter.

9. A method of applying an optical phased array based on lithium niobate thin films for phase shifting control according to claim 1, comprising:

1) outputting, by a laser, a light beam with a narrow linewidth to an input terminal of a coupling beam splitter, and splitting, by the coupling beam splitter, the light beam into multiple channels of light waves;
2) for each channel of the light waves, performing phase-modulation on the light waves after them enter a corresponding one of the one or more lithium niobate phase shifters so that there is a predetermined phase-shift among the light waves; and
3) for each channel of the light waves, outputting light waves with a certain phase to the grating antenna, and emitting, the light waves with the certain phase, by the grating antenna, into space at a predetermined angle.

10. The method of applying an optical phased array based on lithium niobate thin films for phase shifting control according to claim 9, wherein in step 2), after the light waves enter the corresponding lithium niobate phase shifter, based on an electro-optic effect of lithium niobate, exerting a control signal on the modulation electrodes to change refractive index of lithium niobate in the corresponding lithium niobate phase shifter, so that the phase of light waves in the corresponding lithium niobate phase shifter is shifted through phase-modulation.

11. An optical phased array system based on lithium niobate thin films, comprising:

an optical phased array based on lithium niobate thin films for phase shifting control according to claim 1 and a control circuit; wherein the control circuit comprises:
a power output unit, used to output a voltage;
a metal-oxide-semiconductor (MOS) transistor switching array, connected between the power output unit and a control electrode of the optical phased array, providing a phase shifting channel for the optical phased array;
a capacitor array, wherein two terminals of each capacitor unit of the capacitor array are connected to the control electrode and a ground electrode of the optical phased array respectively; and
a control unit, used to provide logic and timing control for the optical phased array system through a control bus.

12. The optical phased array system based on lithium niobate thin films according to claim 11, wherein the MOS transistor switching array comprises a plurality of MOS transistor switching units, wherein each MOS transistor switching unit comprises a diode, a PMOS transistor, an NMOS transistor and a resistor; wherein the diode is set in each phase shifting channel and is used to isolate currents in the phase shifting channels from each other; wherein a first terminal of the PMOS transistor is connected to the diode, a second terminal of the PMOS transistor is connected to a terminal of a capacitor unit of the capacitor array, a gate of the PMOS transistor is connected to a first terminal of the NMOS transistor, a second terminal of the NMOS transistor is grounded, a gate of the NMOS transistor is connected to the control bus, and the resistor is connected between the first terminal of the PMOS transistor and the gate of the PMOS transistor.

13. A phase-shifting control system, wherein the phase-shifting control system comprises:

a phase-shifting control circuit comprising:
- a power output unit, comprising a plurality of output terminals, wherein each output terminal is used to output an output voltage;
- an output channel, wherein an input terminal of the output channel is coupled to one of the plurality of output terminals; and
- a phase shifting unit array, comprising a plurality of phase shifting units;

wherein an output terminal of the output channel is coupled to one of the plurality of phase shifting units;

wherein an array of phase shifting units in the phase-shifting control circuit comprises an optical phased array based on lithium niobate thin films for phase shifting control according to claim 1.

14. A phase-shifting control circuit, comprising:

a power output unit, comprising a plurality of output terminals, wherein each of the plurality of output terminals is used to output an output voltage;

an output channel, wherein an input terminal of the output channel is coupled to one of the plurality of output terminals through a single pole double throw switch; and a phase shifting unit array, comprising a plurality of phase shifting units;

wherein an output terminal of the output channel is coupled to one of the plurality of phase shifting units through a single pole multiple throw switch;

wherein the single pole double throw switch is provided with a plurality of phase-shifting input terminals and one phase-shifting output terminal;

wherein the plurality of output terminals of the power output unit are coupled to the input terminal of the output channel through the single pole doble throw switch;

wherein the plurality of phase shifting units comprises a first phase shifting unit, and a second phase shifting unit, and the plurality of output terminals of the power output unit comprises a first output terminal and a second output terminal:

wherein during operation, the output terminal of the output channel is sequentially coupled to each phase shifting unit in a predetermined order, and when the first output terminal of the power output unit outputs a first phase shifting voltage to the first phase shifting unit that is currently coupled to the output terminal of the output channel, an output voltage of the second output terminal of the power output unit is modulated to be a second phase shifting voltage required by the second phase shifting unit; wherein, after a preset time period, the second output terminal of the power output unit is coupled to the input terminal of the output channel to output the second phase shifting voltage required by the second phase shifting unit to the second phase shifting units wherein each phase shifting unit comprises a capacitor, wherein in response to the first output terminal of the power output unit outputting the first phase shifting voltage required by the first phase shifting unit to the capacitor of the first phase shifting unit, the second output terminal of the power output unit is coupled to the input terminal of the output channel to output the second phase shifting voltage required by the second phase shifting unit.

15. The phase-shifting control circuit according to claim 14, wherein the single pole multiple throw switch has a phase-shifting input terminal and a plurality of phase- shifting output terminals;

wherein the output terminal of the output channel is sequentially coupled to each phase shifting unit through the single pole multiple throw switch; wherein at a given time the output terminal of the output channel is coupled to at most one phase shifting unit.

16. The phase-shifting control circuit according to claim 14, wherein each phase shifting unit comprises: a capacitor and an optical waveguide device; wherein the optical waveguide device and the capacitor are connected in parallel.

17. The phase-shifting control circuit according to claim 16, wherein the optical waveguide device is a lithium niobate optical waveguide device, the phase shifting unit array comprises an optical phased array, and the optical phased array comprises:

a silicon substrate;

a silicon oxide layer, disposed over the silicon substrate;

an optical waveguide layer, disposed over the silicon oxide layer; wherein the optical waveguide layer comprises a coupling beam splitter and a grating antenna that are spaced apart by a band-shaped region;

a silicon oxide cladding layer, disposed over the silicon oxide layer and around the coupling beam splitter and the grating antenna, wherein a part of the silicon oxide cladding layer constitutes the band-shaped region, wherein a top surface of the silicon oxide cladding layer is level with a top surface of the optical waveguide layer; and one or more lithium niobate phase shifters; wherein each lithium niobate phase shifter comprises:

a lithium niobate thin film located over the band-shaped region;

the lithium niobate optical waveguide, disposed over the lithium niobate thin film and connected to the coupling beam splitter and the grating antenna; and modulation electrodes, wherein the modulation electrodes are located on the lithium niobate thin film on two sides of the lithium niobate optical waveguide device.

18. The phase-shifting control circuit according to claim 14, further comprising: a control unit, used to provide logic and timing control for the phase-shifting control circuit through a control bus.

* * * * *